(12) United States Patent
Cohen et al.

(10) Patent No.: US 7,873,390 B2
(45) Date of Patent: Jan. 18, 2011

(54) PROVIDER-ACTIVATED SOFTWARE FOR MOBILE COMMUNICATION DEVICES

(75) Inventors: Jordan Cohen, Gloucester, MA (US); Daniel L. Roth, Boston, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 1740 days.

(21) Appl. No.: 10/725,673

(22) Filed: Dec. 3, 2003

(65) Prior Publication Data

US 2004/0110494 A1   Jun. 10, 2004

Related U.S. Application Data

(60) Provisional application No. 60/431,818, filed on Dec. 9, 2002, provisional application No. 60/455,244, filed on Mar. 17, 2003.

(51) Int. Cl.
  *H04B 1/38* (2006.01)
(52) U.S. Cl. ............... 455/563; 455/79; 455/414.1; 455/415; 379/211
(58) Field of Classification Search ............... 455/414, 455/418, 419, 416, 415, 563, 79, 414.1; 379/211, 379/207
See application file for complete search history.

(56) References Cited

U.S. PATENT DOCUMENTS

| | | | | |
|---|---|---|---|---|
| 5,263,181 A | * | 11/1993 | Reed | 455/152.1 |
| 5,509,049 A | * | 4/1996 | Peterson | 455/563 |
| 5,572,583 A | * | 11/1996 | Wheeler et al. | 379/221.09 |
| 5,585,789 A | | 12/1996 | Haneda | |
| 5,794,142 A | | 8/1998 | Vanttila et al. | 455/419 |
| 5,924,068 A | | 7/1999 | Richard et al. | |
| 6,029,065 A | * | 2/2000 | Shah | 455/414.4 |
| 6,064,880 A | | 5/2000 | Alanara | |
| 6,131,017 A | * | 10/2000 | Lebby et al. | 455/73 |
| 6,295,291 B1 | | 9/2001 | Larkins | 370/352 |
| 6,393,403 B1 | | 5/2002 | Majaniemi | |
| 6,405,033 B1 | * | 6/2002 | Kennedy et al. | 455/414.1 |
| 6,449,496 B1 | | 9/2002 | Beith et al. | |
| 6,526,335 B1 | * | 2/2003 | Treyz et al. | 701/1 |
| 6,546,002 B1 | | 4/2003 | Kim | |

(Continued)

FOREIGN PATENT DOCUMENTS

DE   199 59 903   6/2001

(Continued)

*Primary Examiner*—Minh D Dao
(74) *Attorney, Agent, or Firm*—Sunstein Kann Murphy & Timbers LLP

(57) ABSTRACT

A mobile voice communication device including a wireless transceiver circuit for transmitting and receiving voice communications and for receiving data; a digital processor; and a memory storing application program code which when executed on the digital processor causes the mobile voice communication device to provide predetermined functionality to the user of the mobile voice communication device. The predetermined functionality includes basic features and it includes enhanced features that are in addition to the basic features. The application program code has a deactivated state in which the mobile voice communication device provides the basic features to the user without providing the enhanced features and an activated state in which the mobile voice communication device provides the enhanced features. Toggling between the deactivated and activated states is accomplished by receiving through the wireless transceiver circuit a transmitted key that was sent by a remote source to that mobile voice communication device.

23 Claims, 2 Drawing Sheets

U.S. PATENT DOCUMENTS

| | | | |
|---|---|---|---|
| 6,859,699 B2 * | 2/2005 | Carroll et al. | 701/33 |
| 6,965,786 B2 * | 11/2005 | Qu et al. | 455/566 |
| 7,120,424 B1 * | 10/2006 | Coan et al. | 455/414.1 |
| 2001/0016487 A1 | 8/2001 | Hiatt | |
| 2002/0029203 A1 | 3/2002 | Pelland et al. | |
| 2002/0123881 A1 | 9/2002 | Schmid et al. | |
| 2002/0142787 A1 | 10/2002 | Holley et al. | |
| 2003/0040327 A1 | 2/2003 | Park | |
| 2003/0149564 A1 * | 8/2003 | Gong et al. | 704/246 |
| 2003/0235288 A1 * | 12/2003 | McCormack | 379/265.02 |
| 2004/0072585 A1 | 4/2004 | Le et al. | |
| 2004/0110494 A1 * | 6/2004 | Cohen et al. | 455/414.1 |
| 2004/0137890 A1 * | 7/2004 | Kalke | 455/418 |
| 2004/0185825 A1 * | 9/2004 | Preiss et al. | 455/405 |
| 2004/0203651 A1 * | 10/2004 | Qu et al. | 455/414.1 |
| 2006/0281495 A1 * | 12/2006 | Yang | 455/563 |

FOREIGN PATENT DOCUMENTS

| | | |
|---|---|---|
| EP | 1 024 674 | 8/2000 |
| EP | 1 043 906 | 10/2000 |
| EP | 1 104 155 | 5/2001 |
| EP | 1 263 248 | 12/2002 |
| EP | 1 271 469 | 1/2003 |
| EP | 1 372 327 | 12/2003 |
| EP | 1 400 953 | 3/2004 |
| WO | WO-02/41139 | 5/2002 |
| WO | WO-2004/008434 | 1/2004 |
| WO | WO-2004/015965 | 2/2004 |

* cited by examiner

PROVIDER-ACTIVATED SOFTWARE FOR MOBILE COMMUNICATION DEVICES

This application claims priority under 35 U.S.C. §1.19(e) to U.S. Provisional Patent Application Ser. No. 60/455,244, entitled "Provider-Activated Software For Mobile Communication Devices," filed on Mar. 17, 2003, and to U.S. Provisional Patent Application Ser. No. 60/431,818, entitled "A Business Model for Speech Technology," filed on Dec. 9, 2002, both of which are hereby incorporated by reference.

TECHNICAL FIELD

The invention relates generally to wireless communication devices having installed application software.

BACKGROUND

Mobile voice communication devices, such as cellular telephones, have primarily functioned to transmit and receive voice communication signals. But as the technology has advanced in recent years, additional functions have also become available on cellular phones. Examples of this added functionality include an onboard telephone directory, voice recognition capabilities, voice-activation features, games, and notebook functions, just to name a few. Indeed, not only are these capabilities being added to cellular phones but voice communication capabilities are being added to computing platforms such as the PDA (personal digital assistant); thus blurring the distinction between cellular phones and other handheld computing devices.

One example of a more modern mobile communication and computing device is the T-Mobile pocket PC Phone Edition, which includes a cellular telephone integrated with a hand-held computing device running the Microsoft Windows CE operating system. The pocket PC includes an Intel Corp. StrongARM processor running at 206 MHz, has 32 MB of RAM (memory), a desktop computer interface and a color display. The pocket PC is a mobile platform meant to provide the functions of a cellular telephone and a personal digital assistant (PDA) in a single unit.

Some of the current wireless voice communication devices provide a text messaging function, known as SMS (Short Message Service) text messaging. This text messaging function enables users to use the alphanumeric keypad on the device to compose short text messages (i.e., up to 160 characters) that are then sent over a low bandwidth channel that is available in cellular communication technology. Text messaging can be a very convenient way to communicate and probably because of that, it has become quite popular, especially in Europe.

SUMMARY OF THE INVENTION

In general, in one aspect, the invention features a mobile voice communication device that includes a wireless transceiver circuit for transmitting and receiving voice communications and for receiving data; a digital processor; and a memory storing application program code which when executed on the digital processor causes the mobile voice communication device to provide predetermined functionality to the user of the mobile voice communication device. The predetermined functionality includes basic features and it includes enhanced features that are in addition to the basic features. The application program code has a deactivated state in which the mobile voice communication device provides the basic features to the user without providing the enhanced features and an activated state in which the mobile voice communication device provides the enhanced features. Toggling between the deactivated and activated states is accomplished by receiving through the wireless transceiver circuit a transmitted key that was sent by a remote source to that mobile voice communication device.

Other embodiments include one or more of the following features. The mobile voice communication device is a cellular telephone. The predetermined functionality that is provided by the application program code is speech recognition. The transmitted key is an activation key that switches the application program code from the deactivated state to the activated state. The transmitted key uniquely identifies the mobile voice communication device.

In general, in another aspect, the invention features a method for generating revenue. The method includes establishing an account for each of a plurality of wireless voice communication devices, wherein on each of the wireless communication devices there is an application program for providing predetermined functionality for that wireless communication device, the predetermined functionality having basic features and also having enhanced features that are in addition to the basic features, the application program also having a deactivated state in which the wireless voice communication device provides the basic features to a user of the device without providing the enhanced features and an activated state in which the wireless voice communication device provides the enhanced features. The method also includes selecting one of the plurality of wireless communication devices on which to switch the application program from a first state to a second state, wherein the first state is one of the activated state and the deactivated state and the second state is the other of the activated state and the deactivated state; transmitting a key to the selected device, wherein the key is for causing the application program in the wireless communication device to switch from the first state to the second state; and after the key is sent to the selected device, billing the account for the features provided by the second state.

Other embodiments include one or more of the following features. The predetermined functionality that is provided by the application program is speech recognition. The first state is the activated state and the second state is the deactivated state. The method also includes, prior to selecting one of the plurality of wireless communication devices on which to send the key, sending a message to the selected device for notifying a user that the enhanced features are available after a trial period for a fee. The first state is the deactivated state and the second state is the activated state. The key is an activation key that uniquely identifies the selected device among the plurality of wireless communication devices. The billing involves periodically billing the entity for having access to the enhanced features while the enhanced features are activated.

In general, in yet another aspect, the invention features a method for generating revenue. The method involves establishing an account for each of a plurality of wireless voice communication devices, wherein on each of said wireless communication devices there is an application program for providing predetermined functionality for that wireless communication device. The predetermined functionality includes basic features and also includes enhanced features that are in addition to the basic features. The application program has a deactivated state in which the wireless voice communication device provides the basic features to a user of the device without providing the enhanced features and an activated state in which the wireless voice communication device provides the enhanced features. The method also includes selecting one of the plurality of wireless communication devices on which to switch the application program from the deactivated state to the activated state; transmitting an activation key to the selected device, wherein the activation key is for causing the application program in the wireless communication device to switch from the deactivated state to the activated state; and after the enhanced features are activated in the selected device, billing the account for that device for the enhanced features.

DESCRIPTION OF THE EMBODIMENTS

Figure 1:
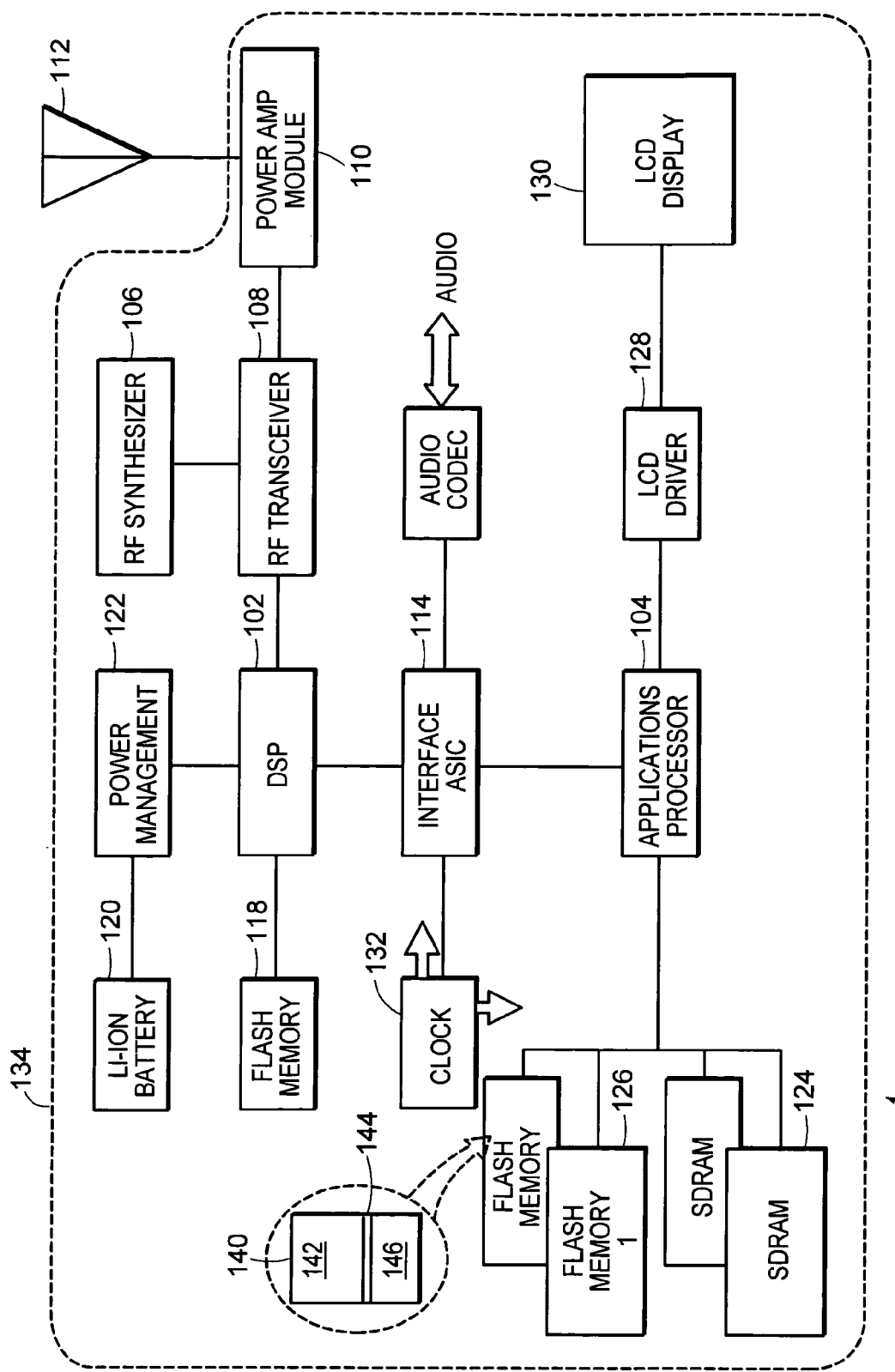
FIG. 1 is a functional block diagram of a smartphone embodiment.

Referring to FIG. 1, in general, the described embodiment is a cellular phone in which there is embedded application software that includes functionality that can be turned on and off remotely (e.g. by the carrier or service provider). In this instance, the application software is voice recognition software that enables the user to access information on the phone (e.g. telephone numbers of identified persons) and to control the cell phone through verbal commands. The voice recognition software also includes enhanced functionality in the form of a speech-to-text function that enables the user to enter text into an email message through spoken words. The enabling and disabling of the enhanced functionality within the speech recognition software is controlled by a software switch. The carrier is able to turn on or turn off the software switch and thereby enable or disable the speech-to-text functionality by sending a special "key" to the user's cell phone.

The cellular phone with the remotely switchable enhanced functionality underlies a new revenue-generating model for providing services to cell phone users. In essence, the enabling of software functionality that is embedded on the user's cellular phone becomes a revenue-generating event. For the enhanced functionality that is enabled by the carrier, the user agrees to pay a monthly charge for so long as that functionality remains activated. The carrier collects the income stream generated by enabling the new functionality and shares a portion of that income with the entity which provided the software. This enables the software company to more equitably share in the financial rewards made possible by the software which the company designed for the phone.

Figure 2:
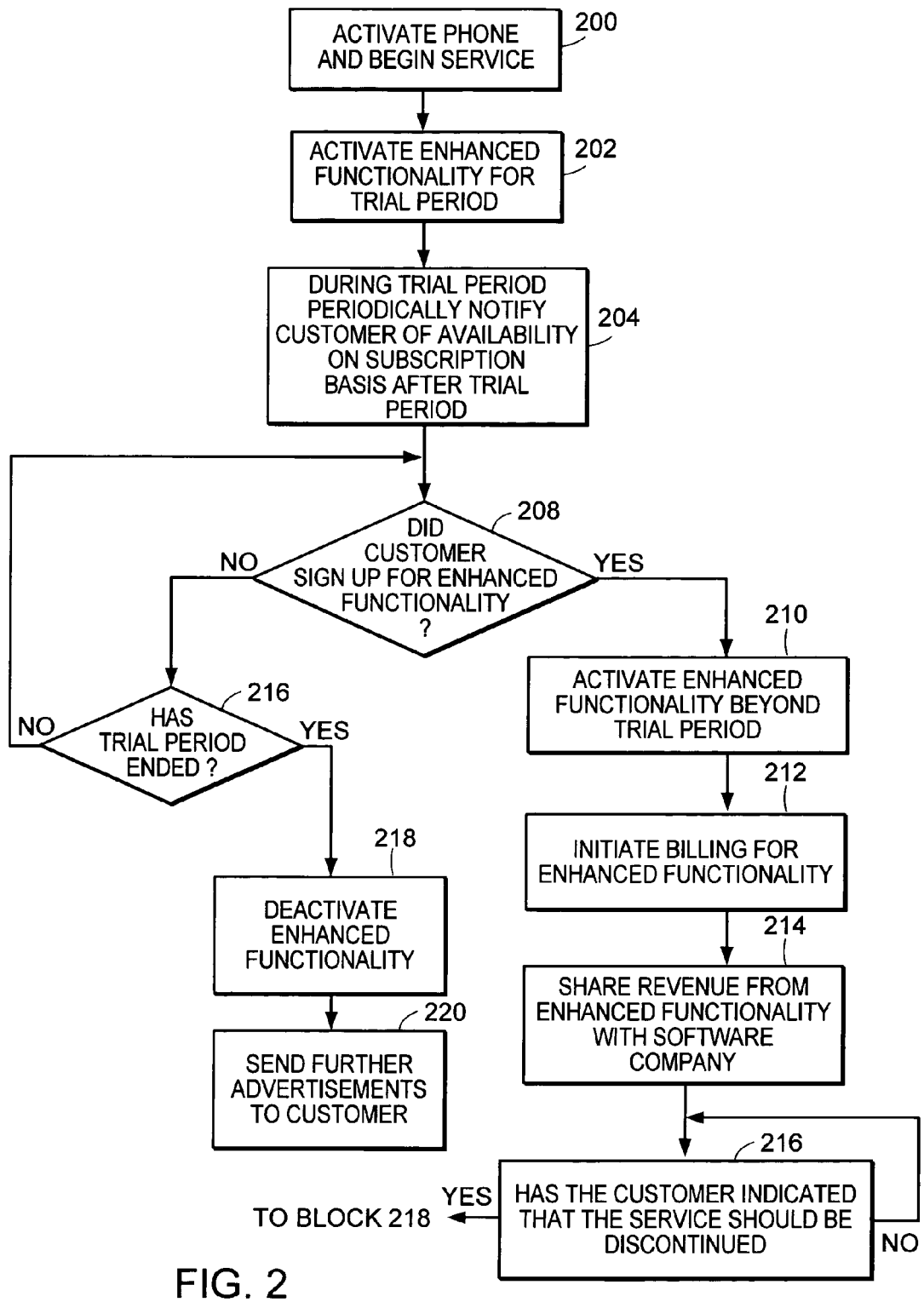
FIG. 2 is a flow diagram of a revenue-generating model that uses the technology illustrated by FIG. 1.

A typical platform on which such functionality can be provided is a smartphone 100, such as is illustrated in the high level block diagram form in FIG. 2. In the described embodiment, smartphone 100 is a Microsoft PocketPC-powered phone which includes at its core a baseband DSP 102 (digital signal processor) for handling the cellular communication functions (including for example voiceband and channel coding functions) and an applications processor 104 (e.g. Intel StrongArm SA-1110) on which the PocketPC operating system runs. The phone supports GSM voice calls, SMS (Short Messaging Service) text messaging, wireless email, and desktop-like web browsing along with more traditional PDA features.

The transmit and receive functions are implemented by an RF synthesizer 106 and an RF radio transceiver 108 followed by a power amplifier module 110 that handles the final-stage RF transmit duties through an antenna 112. An interface ASIC 114 and an audio CODEC 116 provide interfaces to a speaker, a microphone, and other input/output devices provided in the phone such as a numeric or alphanumeric keypad (not shown) for entering commands and information. DSP 102 uses a flash memory 118 for code store. A Li-Ion (lithium-ion) battery 120 powers the phone and a power management module 122 coupled to DSP 102 manages power consumption within the phone. Volatile and non-volatile memory for applications processor 114 is provided in the form of SDRAM 124 and flash memory 126, respectively. This arrangement of memory is used to hold the code for the operating system, the code for customizable features such as the phone directory, and the code for any applications software that might be included in the smartphone, including the voice recognition software mentioned above. The visual display device for the smartphone includes an LCD driver chip 128 that drives an LCD display 130. There is also a clock module 132 that provides the clock signals for the other devices within the phone and provides an indicator of real time.

All of the above-described components are packages within an appropriately designed housing 134.

Since the smartphone described above is representative of the general internal structure of a number of different commercially available smartphones and since the internal circuit design of those phones is generally known to persons of ordinary skill in this art, further details about the components shown in FIG. 1 and their operation are not being provided and are not necessary to understanding the invention.

The internal memory of the phone includes all relevant code for operating the phone and for supporting its various functionality, including code 140 for the voice recognition application software, which is represented in block form in FIG. 1. The voice recognition application includes code 142 for its basic functionality as well as code 144 for enhanced functionality, which in this case is speech-to-text functionality 144. The activation and/or deactivation of the speech-to-text functionality is controlled by a software switch 146.

When the speech-to-text functionality is activated, the user is able to use that functionality to generate short text messages by speaking into the phone. The user's spoken word is converted to text that is inserted into the body of a short text message. Once the text message is completed and properly addressed, it is then sent to the intended recipient by using, for example, the SMS messaging capabilities of the smartphone.

The software switch is operated by a digital "key" that is supplied, typically by the carrier or service provider. The key is a password or encryption key that the locally stored application in the cell phone uses to activate or deactivate the enhanced functionality. In other words, the application program includes code that uses the key which it receives to either activate or deactivate the enhanced functionality, depending on the particular key that is supplied. In fact, any mechanism that enables a remote entity to accomplish the activation or deactivation function can be used.

One business model for generating revenue through making the speech-to-text functionality available to the purchasers of the smartphones phones operates as follows. The software company provides to the cell phone manufacturer the software code for the voice-recognition application having the speech-to-text functionality. The cell phone manufacturer integrates that code into its cellular phones along with whatever software and/or code that is necessary to implement the underlying cellular communication functions and along with any other software applications that the manufacturer might want to include on the phone, e.g. games, an organizer program, a phone directory. Then, these phones are sent out into the various distribution channels that are used by that manufacturer.

When a customer purchases the cellular phone, including the embedded voice recognition software with the enhanced functionality, the seller activates the phone and establishes service through a local service provider or carrier, which sets up an account for that phone (block 200). At this time, the seller also initializes the enhanced functionality so that it is in an activated state (block 202). It will remain in the activated state for a predetermined trial period (e.g. one to three months) after which the customer must request that the functionality be activated as a subscription service. During the trial period, the purchaser has full access to and can experience the benefits of the enhanced functionality. In essence, the customer is permitted to "test drive" the enhanced functionality to evaluate whether it is something that he would want to purchase. During that trial, the carrier periodically sends notices (e.g. SMS text messages) to the customer reminding him that the enhanced functionality is available free for the trial period and instructing the customer how to sign up so as to continue having access to the enhanced functionality beyond the trial period (block 204). In the described example, the customer signs up by sending a SMS message to the carrier including a PIN number confirming the source of the request.

If the customer allows the trial period to elapse without signing up for the enhanced functionality (blocks 208 and 216), then the carrier sends a deactivation key to the customer's phone turning off the enhanced functionality (block 218).

If we assume, however, that the customer signs up for the enhanced functionality, the carrier will receive an appropriate indication from the customer of his wish to continue the service (i.e., a sign-up request and billing authorization). Upon receiving the sign-up request and billing authorization from the customer (block 208), the carrier sends an activation key to the customer's cell phone to activate the enhanced functionality beyond the trial period (block 210). Concurrently with or in close proximity to activating the enhanced functionality, the carrier also initiates a billing function which charges the customers account on a monthly basis for the enhanced functionality (block 212). Thereafter, and for as long as the enhanced functionality remains activated, the monthly bill to the customer will include a monthly charge for the enhanced features.

The activation of the enhanced functionality on the customer's cell phone will result in an revenue stream to the carrier. The carrier, typically in accordance with a previously executed agreement with the provider of the software, shares that revenue steam with the software company (block 214). There are many alternative ways in which this can be accomplished. In the described embodiment, either upon billing the customer the monthly fee for the enhanced functionality or upon receiving that fee from the customer, the carrier also credits an account for the software company with a portion of the subscription payment.

If at a later date the customer fails to make payments for the enhanced functionality or if the customer discontinues his subscription for that functionality (block 216), the carrier sends a deactivation key to the customer's cell phone turning off that feature (block 218). Thereafter, in an effort to get the customer back, the carrier might periodically send to that former customer notices or advertisements about the continued availability of the enhanced functionality or even about improved later-developed versions of it (block 220).

At multiple points along the flow diagram presented in FIG. 2, there are, of course, alternative ways of achieving the general objective associated with that stage of the process. For example, there are multiple alternative ways by which the customer might notify the carrier of his request to sign-up for the service. The notification might be by entering an appropriate sequence of keystrokes on the cellular phone, by telephone call to the carrier or its representative, by sending an SMS text message, by sending email, by regular mail, etc.

On a more general level, there are also many alternative approaches to implementing a business model that generates a shared revenue stream for making the enhanced functionality available to customers. For example, instead of requiring the customer to request activation of the enhanced functionality, the functionality can simply remain activated beyond the trial period and the carrier will automatically start billing the customer for the service when the trial period ends. To not accept that enhanced functionality, the customer must affirmatively instruct the carrier to deactivate the enhanced functionality and either not start billing or, if billing had already started, discontinue billing for the functionality. If the customer instructs the carrier to turn off the enhanced features, then the carrier sends a deactivation key to the customer's cell phone and takes whatever action is appropriate on the billing side of the transaction.

There are also alternative ways to those presented above of making the enhanced functionality available to customer. For example, as an alternative to making the enhanced functionality available to the user for a limited period of time (i.e., a trial period), that functionality can be delivered in a deactivated state and the carrier notifies the customer periodically through messages sent to the customer's phone and/or to his residential street address that such enhanced functionality is supported on his phone and can be activated upon request. If notifications are sent to the customer's cell phone, they can be sent either as voice messages left in his mailbox, as short SMS text messages stored in the phone, as web pages that are displayed on the browser in the phone, or as messages sent through any available communication channel on the phone. In this case, the software switch is set to a deactivated state when the customer buys the phone and remains in that state until the customer subscribes to the enhanced functionality at which point the carrier sends an activation key to the phone.

Instead of sending notifications from to the phone from a location external to the phone, those notifications can be generated internally by software in the phone. That is, the phone can store in its internally memory prepared advertisements that are periodically displayed to the user over a predetermined period of time.

Similarly, there are ways of activating and deactivating the enhanced functionality other than those described above. For example, if the phone is delivered to the customer with the enhanced functionality activated for a trial period, the shut off of that functionality at the end of that period can be done locally. That is, instead of the carrier having to send a deactivation key, the phone can be programmed to switch off the functionality. This could be done by using the on board clock to determine the arrival of the date on which the trial period ends or to measure when the amount of elapsed time equals the length of the trial period.

The activation key, if sent by the carrier, can be sent over the SMS channel or via any other available means. For example, it can be communicated to the user who then enters it through the keypad on the phone. Or it can be downloaded from the web.

Though the described embodiment uses a PocketPC operating system, other operating systems are available and those other operating systems can be used as platforms for implement the remotely switchable enhanced functionality. Those other operating systems include the Symbian OS offered by Symbian Ltd. of the United Kingdom, as well as the more primitive operating systems that are found on many current cellular phones. In the cell phones with the more primitive operating systems, the code which implements the functionality described herein will likely need to be more tightly integrated into the operating code within the cellular phone. The tight integration that is required in those instances might well rule out uploading of the application software into the cellular phone as an option for delivering the functionality to the phone and will instead necessitate that the code be integrated into the phone when it is manufactured by the cell phone manufacturer.

There is also commercially available voice recognition software designed for or usable on smartphones that can be used to help implement the functionality described herein. Two examples of such software are ViaVoice from IBM and Voice LookUp from HandHeld Speech, just to name two examples.

The concepts described herein apply to a much broader range of applications in the speech recognition area than the speech-to-text example that was described above. Other examples of enhanced functionality that might be implemented include natural language functionality or extended word recognition dictionaries. The natural language functionality enables the user to issue phone operating commands using normal spoken language instead of having to know particular commands for the desired functions. In the case of extended word recognition dictionaries, the phone can be delivered with a more limited dictionary that is used as the active dictionary and an extension to that dictionary that is present but deactivated. The more limited dictionary limits the user to a more limited set of spoken words. The enhanced dictionary, when activated, expands the spoken word vocabulary that is available to the user in communicating with the phone.

The approach of including the enhanced functionality in the phone that is delivered to the customer at the point of purchase is particularly useful for software applications that are large and complicated like voce recognition applications. Due to their large size, it is generally not practical to download the code into the phone. However, instead of including the code for the enhanced functionality within the phone delivered to the customer, in some circumstances it might be acceptable to require the customer to download the code. The resulting code that provides the enhanced functionality would, of course, still need to include the software switch so that it can be deactivated should the user decide at a later date that he no longer wishes to pay for the enhanced functionality.

For the enhanced functionality, it is also possible to split that functionality between the handheld device and a remote server, performing front end processing on the handheld device and performing backend processing on the remote server. For example, one could do proximate word recognition on the handheld device and complete the recognition on the emote server.

The concepts described herein can also be implemented on other mobile wireless communication platforms in addition to cellular phones or smartphones. Examples of other platforms include, without limitation, PDAs (Personal Digital Assistant) with wireless capabilities such as the Palm Pilot, the Blackberry and other handheld computing devices; pagers; and handheld notebook computers with wireless communication devices attached. The functionality for which the enhanced capabilities can be activated and deactivated need not be limited to speech recognition. One can also image using the above-described approach for handwriting recognition and image recognition and for any capabilities that provide an alternative way of inputting information or commands into the handheld communication device.

Other aspects, modifications, and embodiments are within the scope of the following claims.

What is claimed is:

1. A cellular phone comprising:
a wireless transceiver circuit for transmitting and receiving voice communications and for receiving data;
a digital processor; and
a memory storing application program code which when executed on the digital processor causes the cellular phone to provide predetermined functionality to the user of the cellular phone, wherein said predetermined functionality is speech recognition, said predetermined functionality having basic features and having enhanced features that are in addition to the basic features, said application program code including a software switch for toggling back and forth between a first state and a second state, wherein the first and second states represent a deactivated state in which the cellular phone provides said basic features to the user without providing said enhanced features and an activated state in which the cellular phone provides the enhanced features, and wherein toggling from the first state to the second state is accomplished by receiving through the wireless transceiver circuit a transmitted key that was sent by a remote source to that cellular phone.

2. The cellular phone of claim 1, wherein the transmitted key is an activation key that switches the application program code from the deactivated state to the activated state.

3. The cellular phone of claim 1 wherein the transmitted key uniquely identifies the selected phone among the plurality of cellular phones.

4. The cellular phone of claim 1, wherein the first state is the deactivated state and the second state is the activated state.

5. The cellular phone of claim 1, wherein toggling from the second state to the first state is accomplished by receiving through the wireless transceiver circuit a second key that was sent by a remote source to that cellular phone.

6. A method for generating revenue comprising:
establishing an account for each of a plurality of cellular phones, wherein on each of said cellular phones there is an application program for providing predetermined functionality for that cellular phone, wherein said predetermined functionality is speech recognition, said predetermined functionality having basic features and also having enhanced features that are in addition to the basic features, said application program including a software switch for toggling back and forth between a deactivated state in which the cellular phone provides the basic features to a user of the phone without providing the enhanced features and an activated state in which the cellular phone provides the enhanced features;
selecting one of the plurality of cellular phones on which to switch the application program from the deactivated state to the activated state;
transmitting an activation key to the selected, said activation key for causing the application program in the cellular phone to switch from the deactivated state to the activated state;
after the enhanced features are activated in the selected phone, billing the account for that phone for the enhanced features; and
at some later time after activating the enhanced features in the selected phone, transmitting a deactivation key to the selected phone for causing the application program in the cellular phone to switch from the activated state to the deactivated state.

7. The method of claim 6, further comprising:
prior to selecting one of the plurality of cellular phones on which to send the activation key, sending a message to the selected phone for notifying a user that the enhanced features are available after a trial period for a fee.

8. The method of claim 6 wherein the activation key uniquely identifies the selected phone among the plurality of cellular phones.

9. The method of claim 6, further comprising:
prior to selecting one of the plurality of cellular phones on which to activate the enhanced functionality, sending a message to that phone providing notification of the availability of the enhanced features for a fee.

10. A method comprising:
providing voice recognition software embedded within a mobile communication, the embedded software including a basic functionality enabling a user of the phone to verbally control at least one operation thereof;
activating an enhanced functionality of the embedded software in response to a digital activation key, the enhanced functionality including a natural language capability further facilitating verbal control of the phone; and
deactivating the enhanced functionality of the embedded software in response to a digital deactivating key, wherein the digital activation key and the digital deactivation key are wirelessly transmitted from a service provider to the phone.

11. The method of claim 10, wherein the verbal control of the at least one operation enabled by the basic functionality comprises accessing telephone numbers stored in the cellular phone.

12. The method of claim 10, wherein the verbal control of the cellular phone facilitated by the natural language capability of the enhanced functionality enables the user to enter text into an email using spoken words.

13. The method of claim 10, wherein the verbal control of the cellular phone facilitated by the natural language capability of the enhanced functionality enables the user to verbally operate the device without requiring the user to know particular commands for desired phone functions.

14. The method of claim 10, wherein the verbal control of the at least one operation enabled by the basic functionality comprises performing proximate word recognition, and wherein the verbal control of cellular phone facilitated by the natural language capability of the enhanced functionality comprises performing complete word recognition.

15. The method of claim 14, wherein at least a portion of the complete word recognition is performed on a remote server.

16. The method of claim 10, further comprising:
billing the user for the enhanced functionality in response to a transmission of the digital activation key to the cellular phone.

17. The method of claim 16, wherein the digital activation key is transmitted by at least one of a carrier and a service provider.

18. The method of claim 16, wherein the digital activation key corresponds to at least one of a password and an encrypted key.

19. The method of claim 10, wherein the enhanced functionality is activated by a carrier associated with the cellular phone.

20. The method of claim 10, wherein the enhanced functionality is available free of charge during a trial period.

21. The method of claim 20, further comprising:
sending a message to the cellular phone notifying the user of the availability of the enhanced functionality for a fee following expiration of the trial period.

22. The method of claim 21, further comprising:
upon the user subscribing to the enhanced functionality prior to the expiration of the trial period, sending another digital key to the cellular phone to activate the enhanced functionality beyond the trial period.

23. The method of claim 20, further comprising:
displaying an advertisement on the cellular phone notifying the user of the availability of the enhanced functionality for a fee following expiration of the trial period, wherein the advertisement is stored locally within the cellular phone and is displayed independently of any remotely-transmitted messages.

* * * * *